United States Patent [19]

Westerberg

[11] 3,898,629

[45] Aug. 5, 1975

[54] APPARATUS FOR SCANNING A DATA RECORD MEDIUM

[76] Inventor: Erik Gerhard Natanael Westerberg, Hastskovagen 7A, S-183 50, Taby, Sweden

[22] Filed: Jan. 30, 1973

[21] Appl. No.: 327,991

[30] Foreign Application Priority Data

Feb. 1, 1972 Sweden .......................... 1119/72

[52] U.S. Cl.. 340/173 LT; 178/6.7 R; 179/100.3 B; 179/100.3 V; 340/173 LM

[51] Int. Cl. ............................................ G11c 13/04

[58] Field of Search .......... 179/100.2 MD, 100.3 V, 179/100.3 B, 100.3 L; 340/173 LM, 173 LT; 178/6.7 A, 6.7 R

[56] References Cited

UNITED STATES PATENTS

| | | | |
|---|---|---|---|
| 2,938,126 | 5/1960 | Adler | 250/219 |
| 3,183,494 | 5/1965 | Welsh | 179/100.2 MD |
| 3,183,495 | 5/1965 | Blain | 179/100.2 MD |
| 3,391,247 | 7/1968 | Frohbach | 178/6.7 A |
| 3,534,181 | 10/1970 | Zimmermann | 179/100.3 V |
| 3,696,344 | 10/1972 | Feinleib et al. | 340/173 LM |
| 3,720,924 | 3/1973 | Aagard | 340/173 LM |
| 3,774,172 | 11/1973 | Silverman | 340/173 LT |

*Primary Examiner*—Stuart N. Hecker
*Attorney, Agent, or Firm*—Cushman, Darby & Cushman

[57] ABSTRACT

A device for scanning a data record medium reads data optically and may also be used to record data on the medium, the medium being scanned by a light beam such as a laser beam. A rotor driven by an electric motor comprises a substantially hollow shaft and at least one hollow arm radially extending from the shaft and being provided with an opening for said scanning. The rotor shaft and the arm or arms contain optical means such as mirrors, prisms and lenses such that a light beam entering the open-ended rotor shaft is passed through the shaft and the arm, and is modulated by recorded data and is then passed through said arm or another arm and through the shaft to a photocell so that both the light input and the light output of the rotor is coaxial with the axis of the rotor shaft. In operation, the record medium such as a photographic film or plate is moved radially away from or towards the axis of the rotor in timed relationship with the rotation of the rotor.

10 Claims, 3 Drawing Figures

PATENTED AUG 5 1975 3,898,629

APPARATUS FOR SCANNING A DATA RECORD MEDIUM

Figures 1, 2, 3:
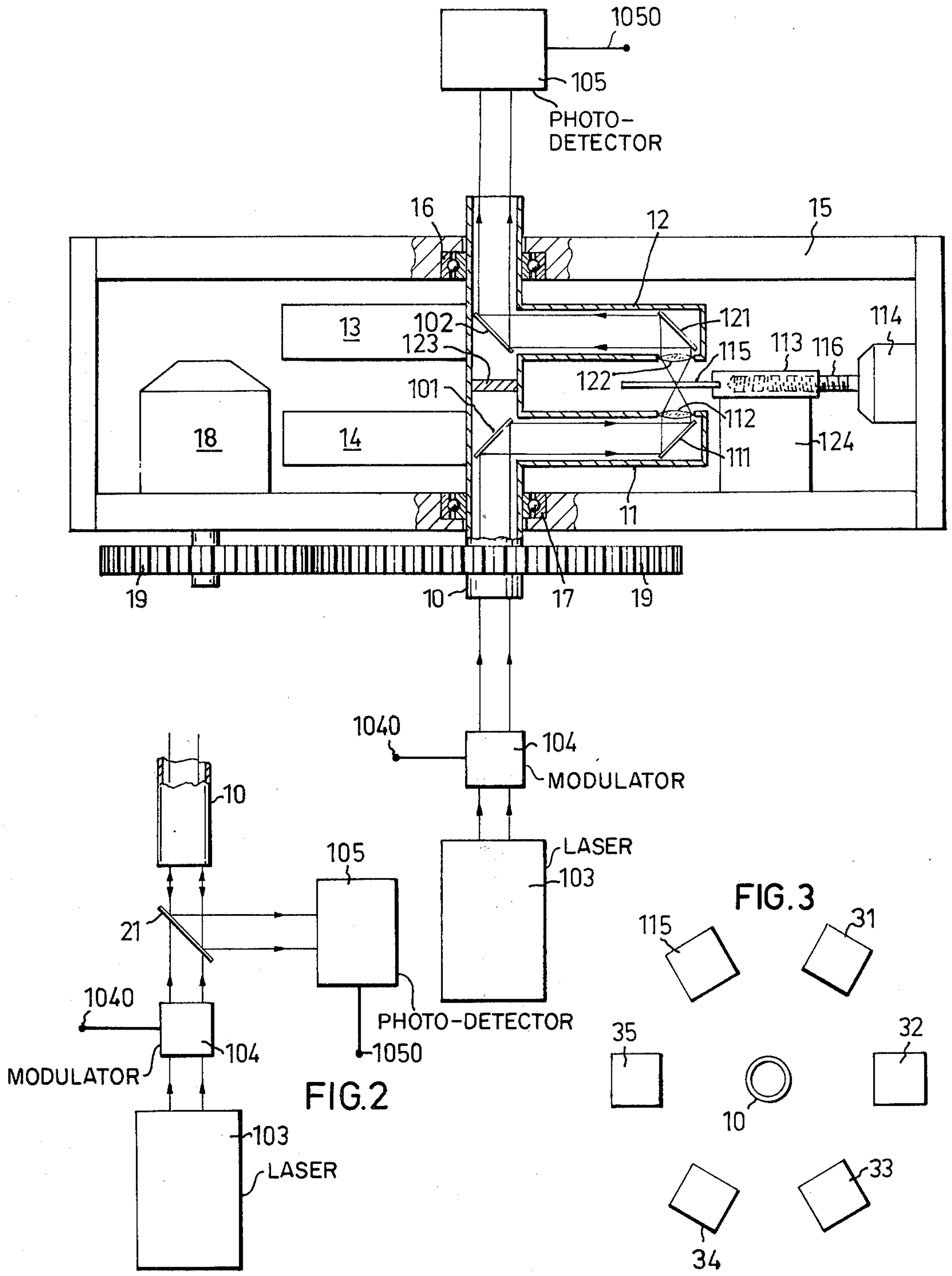

The present invention relates to a scanning apparatus for reading data from and/or writing data on a record medium comprising a light source for optically scanning the record medium, and a detector for detecting the light projected from the light source and acting upon the record medium and comprising a photocell arrangement, for example.

The magnetic tape recording technique is at present the current method of storing large quantities of data. Since magnetic recording tapes may reach lengths extending to thousands of meters, it takes considerable time in unfavourable cases to obtain desired information from such tapes, this time, called information access time, being of the order of minutes. By increasing the density at which information is recorded on magnetic tapes, it is possible to shorten the information access time since the same quantity of information can be packed into a shorter tape. Current magnetic tape technique, however, has already progressed to a very large extent with regard to the density at which information is recorded thereon. Consequently, if any considerable improvement is to be made, a new technology must be engaged. More and more interest has been shown in the use of sharply focusing electron beams or light beams for the purpose of storing information in extremely solid densities. Since the advent of the laser beam, this interest has progressively concentrated to optical record media where binary information is entered on a photographic film in the form of dots some microns in size by means, for example, of a well focused laser beam. If this information is placed in a raster (matrix) of 5 microns, a packing density of $4.10^6$ bits/$cm^2$ is obtained. Great difficulties, however, has been found in constructing detecting and scanning devices for record media of such information densities, and the object of the invention is to provide a dynamic record medium scanning apparatus particularly for optical mass data storage.

The invention will be described in more detail by way of example with reference to the accompanying drawing, in which FIG. 1 illustrates diagrammatically an embodiment of the invention, FIG. 2 illustrates a number of elements of a modified embodiment of the apparatus according to FIG. 1, and FIG. 3 shows diagrammatically an arrangement of a plurality of record media.

The apparatus illustrated in FIG. 1 comprises a rotor 10–14 having a rotor shaft 10 which is hollow at least along part of its length, two hollow (tubular) arms 11 and 12 extending from the rotor shaft, and a pair of arms 13 and 14 arranged as counterweights to the arms 11 and 12. The rotor is journaled in a frame 15 by means of bearings 16 and 17 and is rotated, for example, at a speed of 25 revolutions per second by means of a motor 18 and gear 19. Arranged in the bore of the tubular rotor shaft 10 are two mirrors 101 and 102, both positioned at 45° relative to the centre line of the rotor shaft. In the arm 11 there is arranged a mirror 111 and a lens (lens system) 112. A mirror 121 and a lens (lens system) 122 is arranged in the arm 12. The aforementioned lenses and mirrors are so positioned and aligned that light entering through one end, the lower end in the drawing, of the rotor shaft is focused to a point between the arms 11 and 12 and passes out through the other (upper) end of the rotor shaft. The rotor shaft may be of solid construction between the arms 11, 12 or may be provided with an opaque plug or the like, as shown at 123, in this region.

A record medium in the form of a thin, planar plate 115 is shown placed between the arms 11 and 12 in a radial plane relative to the rotor shaft 10. The plate is arranged for longitudinal movement radially in the said plane, i.e., perpendicularly to the rotor shaft, and is attached to a slide 113 which is capable of being moved longitudinally, without angular movement, on a support 124, towards and away from the rotor shaft 10. This longitudinal movement of the plate 115 is effected by means of a motor 114 having a threaded shaft (guide screw) 116 arranged to rotate in the slide 13, which is provided with a corresponding internal thread. As illustrated diagrammatically in FIG. 1 the incoming light is deflected 90° by the mirror 101 and the 90° by the mirror 111 and is then focused to a point on or in the plate 115, whereafter the light is deflected 90° by the mirror 121 and 90° by the mirror 102 so that the light beam passes out through the rotor shaft 10 in the same direction as the light beam incident to the rotor shaft 10.

A laser 103 is arranged to generate a light beam, the intensity of which is modulated, when recording data on a plate 115, by means of a modulator 104 the control input 1040 of which is fed a pulse train comprising pulses which correspond to the information to be recorded. The plate 115 may comprise a photographic film or layer on which binary digital information is recorded in the form of dots along a circular arc when the arms 11, 12 move past the plate 115. Timing or control pulses are fed to the motor 114 synchronously or in rhythm with the rotation of the rotor so that for each rotation of the rotor, the plate 115 is moved towards or away from the rotor shaft, the smallest possible distance moved by the plate being determined by the resolution of the plate 115. Thus, in this way there is obtained a plurality of circle arcs of data information arranged tightly adjacent each other. Rotation of the motor and the pitch of the shaft thread is preferably selected so that the plate 115 is moved through a distance of about 5 microns. When reading information thus recorded on the record medium, an unmodulated laser beam is fed into the rotor shaft 10 and is influenced therein by the exposed and unexposed portions of the plate 115. With the apparatus illustrated in FIG. 1, it may be the unexposed portions which cause interruptions of the beam, and the beam thus modulated by the plate 115 is passed to a photo detector 105, at the output 1050 of which there is obtained an electrical signal representing the desired data information. Alternatively, the data information can be read from the record medium by returning the light reflected by the plate 115 along the same path back through the arm 11 and the lower portion of the rotor shaft 10 and cause it to impinge upon a semi-permeable mirror 21 which reflects turning light to the detector 105 (FIG. 2) presenting a portion of the read-out means illustrated in FIG. 1. With this latter embodiment of the apparatus, the arm 12 and associated optic are not required, and hence this alternative embodiment is simpler and less expensive than the former. Furthermore, the plate 115 may be opaque in such case.

By using only one plate 115, as illustrated in FIG. 1, only a small portion of the rotary movement of the rotor can be used for scanning. A better use can be had, however, by increasing the number of arms and/or the plates with associated auxiliary means. Such an embodiment of the apparatus is illustrated in FIG. 3, where in addition to plate 115 five additional plates 31–35 are symmetrically arranged around the rotor shaft 10. For the sake of simplicity, other elements such as arms, slides, motors etc. forming part of such an apparatus have been omitted.

The plate 115 may have the form of a glass plate carrying a photographic film or layer on which information is recorded by exposure to light, or may comprise a thin metallic film or metal coated film on which information is recorded by perforating the opaque layer by means of high intensity beams.

What I claim is:

1. Apparatus for reading data from at least one record medium, said apparatus comprising:

a. a light source for optically scanning said at least one record medium, b. a detector for detecting the light projected from said light source acting on said at least one record medium, c. a shaft rotatable about an axis, said shaft being open at each end and having hollow portions at least in the portions of said shaft adjacent said open ends, d. drive means for continuously rotating said shaft about said axis and substantially determining the speed at which said apparatus reads data, e. at least one pair of parallel hollow radially extending arms mounted on said shaft, said hollow portions of said shaft communicating with said hollow arms, f. a light permeable opening in each arm of said at least one pair of arms, said openings located functionally opposite each other, one of said openings for focusing light against said at least one record medium, g. optical means for guiding light from said light source entering an open end of said shaft through (i) one of said at least one pair of hollow arms, (ii) said opening in said arm for focusing light against said at least one record medium, (iii) said opening of the other of said at least one pair of hollow arms, (iv) said other hollow arm and (v) out of the other open end of said shaft to said detector, and light from said light source being coaxial with the axis of rotation of said shaft when said light enters an open end of said shaft and when said light exits from the other open end of said shaft, and h. a plurality of bearing means mounting said shaft, said at least one pair of hollow radially extending arms axially located between at least two of said plurality of bearing means.

2. Apparatus as recited in claim 1 wherein said at least one record medium is transparent.

3. Apparatus as recited in claim 1 wherein said at least one record medium is a plate extending in a plane perpendicular to said axis of rotation of said shaft, and further comprising drive means for driving said at least one record medium in said plane.

4. Apparatus as recited in claim 1 wherein a plurality of record media are provided around said shaft for scanning.

5. Apparatus as recited in claim 4 wherein each record medium is a plate extending in a plane perpendicular to the axis of rotation of said shaft, and further comprising drive means for driving said record media in said plane.

6. Apparatus for reading data from at least one record medium, said apparatus comprising:

a. a light source for optically scanning said at least one record medium, b. a detector for detecting the light projected from said light source acting on said at least one record medium, c. a shaft rotatable about an axis, said shaft being open at one end and having a hollow portion at least in the portion of said shaft adjacent said open end, d. drive means for continuously rotating said shaft about said axis, and substantially determining the speed at which said apparatus reads data, e. at least one hollow radially extending arm mounted on said shaft, said hollow portion of said shaft communicating with said at least one hollow arm, f. a light permeable opening in said arm for focusing light from said light source against said at least one record medium, g. a semi-permeable mirror located in the path of a light beam between said light source and said open end of said shaft, h. optical means for guiding light from said light source entering said open end of said shaft through said at least one hollow arm and said opening in said arm, and then back through said at least one hollow arm and said open end of said shaft, whereby said light extending from from said shaft is reflected by said semi-permeable mirror toward said detector, light from said light source being coaxial with the axis of rotation of said shaft both when said light enters and exits from said open end of said shaft, and i. two bearing means for mounting said shaft, said at least one hollow arm axially located between said two bearing means.

7. Apparatus as recited in claim 6 wherein said at least one record medium is reflecting.

8. Apparatus as recited in claim 6 wherein said at least one record medium is a plate extending in a plane perpendicular to said axis of rotation of said shaft, and further comprising drive means for driving said at least one record medium in said plane.

9. Apparatus as recited in claim 6 wherein a plurality of record media are provided around said shaft for scanning.

10. Apparatus as recited in claim 9 wherein each record medium is a plate extending in a plane perpendicular to the axis of rotation of said shaft, and further comprising drive means for driving said record media in said plane.

* * * * *